United States Patent
Hwang (10) Patent No.: US 11,494,430 B2
(45) Date of Patent: Nov. 8, 2022

(54) DATA STORAGE APPARATUS AND DATA PREDICTION METHOD THEREOF

(71) Applicant: ASMedia Technology Inc., New Taipei (TW)

(72) Inventor: Wei-Kan Hwang, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 594 days.

(21) Appl. No.: 16/441,032

(22) Filed: Jun. 14, 2019

(65) Prior Publication Data

US 2020/0334286 A1     Oct. 22, 2020

(30) Foreign Application Priority Data

Apr. 18, 2019   (TW) ................. 108113568

(51) Int. Cl.

| | | |
|---|---|---|
| G06F 9/00 | (2006.01) | |
| G06F 16/58 | (2019.01) | |
| G06N 3/08 | (2006.01) | |
| G06F 9/46 | (2006.01) | |
| G06K 9/62 | (2022.01) | |
| G06F 16/53 | (2019.01) | |

(52) U.S. Cl.
CPC ............ *G06F 16/58* (2019.01); *G06F 9/466* (2013.01); *G06F 16/53* (2019.01); *G06K 9/6267* (2013.01); *G06N 3/08* (2013.01)

(58) Field of Classification Search
None
See application file for complete search history.

(56) References Cited

U.S. PATENT DOCUMENTS

| 6,516,401 B2 | 2/2003 | Fukuhisa et al. | |
|---|---|---|---|
| 2017/0024295 A1* | 1/2017 | Klughart | G06F 11/1662 |
| 2017/0109096 A1* | 4/2017 | Jean | G06F 9/00 |
| 2019/0065964 A1* | 2/2019 | Al Sheikh | G06N 20/00 |

FOREIGN PATENT DOCUMENTS

| CN | 104714753 | 6/2015 |
|---|---|---|
| CN | 109189693 | 1/2019 |
| TW | I382426 | 1/2013 |

OTHER PUBLICATIONS

Lee. HFTL: Hybrid Flash Translation Layer based on Hot Data Identification for Flash Memory. HFTL: Hybrid Flash Translation Layer based on Hot Data Identification for Flash Memory Sep. 15, 2009.*

* cited by examiner

*Primary Examiner* — Tuankhanh D Phan
(74) *Attorney, Agent, or Firm* — JCIPRNET (57) ABSTRACT

A data storage apparatus and a data prediction method thereof are provided. The data storage apparatus includes a memory unit and a prediction unit. The prediction unit acquires a plurality of access location data of a plurality of data access actions of a prior access history of the memory unit. The prediction unit analyzes the prior access history of the memory unit. The prediction unit performs a quantification process on the access location data to acquire a plurality of quantized data corresponding to the prior access history. The prediction unit predicts a data pre-accessing target of the memory unit according to the quantized data.

16 Claims, 10 Drawing Sheets

DATA STORAGE APPARATUS AND DATA PREDICTION METHOD THEREOF

CROSS-REFERENCE TO RELATED APPLICATION

This application claims the priority benefit of Taiwan application serial no. 108113568, filed on Apr. 18, 2019. The entirety of the above-mentioned patent application is hereby incorporated by reference herein and made a part of this specification.

BACKGROUND OF THE INVENTION

1. Field of the Invention

The invention relates to a data access technique, and particularly relates to a data storage apparatus and a data prediction method thereof.

2. Description of Related Art

Owing to the prosperous development of applications relating to cloud computing, the Internet of Things (IoT), and artificial intelligence (AI), the demands of relevant storage apparatuses for high speed data accessing have been increasing. In the various data storage apparatuses with the demands for high speed/massive data accessing, memory units configured to pre-access data have become an indispensable component. Taking cache memories as an example, under the framework of a traditional personal computer (PC), a cache memory may read or retain hot area data in a storage device in advance to facilitate the access speed of the cache memory. However, as the products to which cache memories are applied differ, the pre-accessing process performed by the traditional cache memory can no longer satisfy the needs of various products. Accordingly, several examples are described in the following embodiments to demonstrate how to provide a pre-accessing means for a cache memory applicable to various products, so as to facilitate the access efficiency of the memory unit.

SUMMARY OF THE INVENTION

The invention provides a data storage apparatus and a data prediction method thereof capable of effectively predicting a data pre-accessing target of a memory unit, so as to facilitate the access efficiency of the memory unit.

A data storage apparatus according to an embodiment of the invention includes a memory unit and a prediction unit. The prediction unit is coupled to the memory unit. The prediction unit is configured to acquire a plurality of access location data of a plurality of data access actions in a prior access history of the memory unit. The prediction unit analyzes the prior access history of the memory unit. The prediction unit performs a quantification process on the access location data to acquire a plurality of quantized data corresponding to the prior access history. The prediction unit predicts a data pre-accessing target of the memory unit according to the quantized data.

A data prediction method according to an embodiment of the invention is adapted for a data storage apparatus. The data prediction method includes the following: acquiring, by a prediction unit, a plurality of access location data of a plurality of data access actions in a prior access history of a memory unit; performing, by the prediction unit, a quantification process on the access location data, so as to acquire a plurality of quantized data corresponding to the prior access history; and predicting, by the prediction unit, a data pre-accessing target of the memory unit according to the quantized data.

Based on the above, the data storage apparatus and the data prediction method thereof according to the embodiments of the invention may effectively predict the data pre-accessing target of the memory unit according to the logical block addresses and the sector lengths corresponding to the data access actions. Therefore, the data storage apparatus and the data prediction method thereof according to the embodiments of the invention are capable of providing accurate and efficient data pre-accessing results.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to make the invention more comprehensible, embodiments are described below as the examples to show the invention. Moreover, wherever possible, elements/components/steps with same reference numerals represent same or similar parts in the drawings and embodiments.

Figure 1:
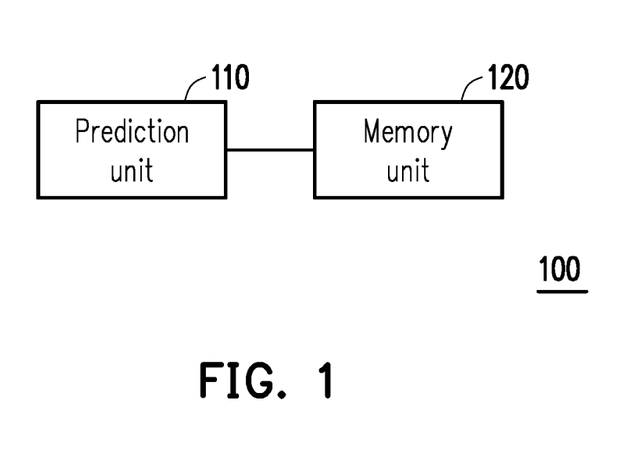
FIG. 1 is a functional diagram illustrating a data storage apparatus according to an embodiment of the invention.

FIG. 1 is a functional diagram illustrating a data storage apparatus according to an embodiment of the invention.

Referring to FIG. 1, a data storage apparatus 100 includes a prediction unit 110 and a memory unit 120. The prediction unit 110 is coupled to the memory unit 120. In the embodiment, the prediction unit 110 is configured to analyze a prior access history of the memory unit 120, so as to predict a data pre-accessing target of the memory unit 120. In the embodiment, the memory unit 120 may be a cache memory, and is configured to pre-access data from a storage device. However, the type of the memory unit 120 of the invention is not limited thereto. Besides, the pre-processing unit of the embodiment may be realized as a software module or a corresponding hardware circuit used together. However, the invention is not limited thereto, either.

In an embodiment, the prediction unit 110 may be stored in advance in the form of firmware in the data storage apparatus 100. In addition, the prediction unit 110 may be executed by a memory controller or a processor. For example, the prediction unit 110 may be a programmable read-only memory (PROM) stored in an application specific integrated circuit (ASIC) or a programmable logic device (PLD). When the data storage apparatus 100 is in use, the prediction unit 110 may be read and executed accordingly. Alternatively, in another embodiment, the prediction unit 110 may be stored as an application in the form of software in advance in the memory unit 120 or other memories. Accordingly, when the data storage apparatus 100 is in use, the prediction 110 may be read and executed by the processor.

Figure 2:
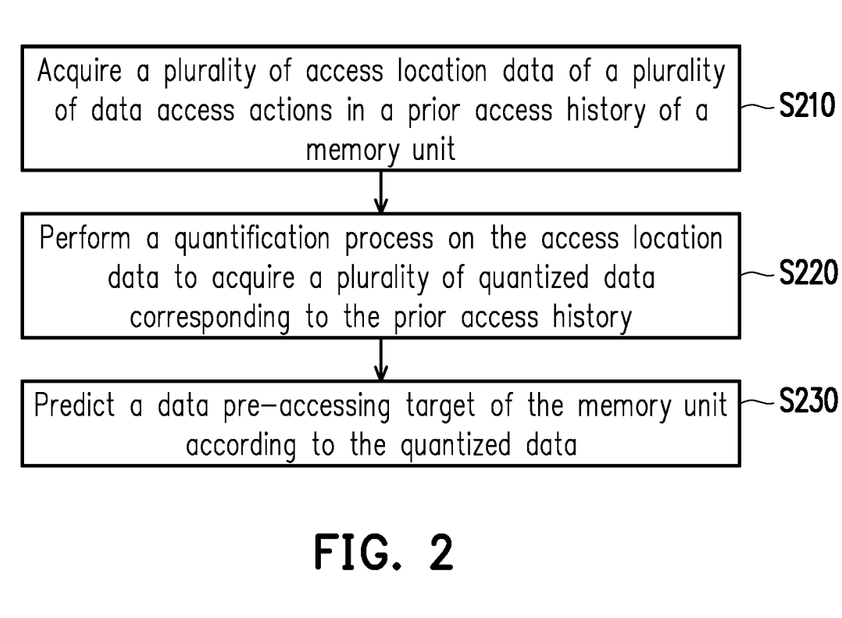
FIG. 2 is a flowchart illustrating a data prediction method according to the embodiment of FIG. 1 of the invention.

FIG. 2 is a flowchart illustrating a data prediction method according to the embodiment of FIG. 1 of the invention. Referring to FIGS. 1 and 2, the data storage apparatus 100 of FIG. 1 may execute Steps S210 to S230 in the data prediction method of FIG. 2. In Step S210, the prediction unit 110 acquires a plurality of access location data of a plurality of data access operations in the prior access history of the memory unit 120. In Step S220, the prediction unit 110 performs a quantification process on the access location data, so as to acquire a plurality of quantized data corresponding to the prior access history. In Step S230, the prediction unit 110 predicts the data pre-accessing target of the memory unit 120 according to the quantized data. Therefore, the data prediction method of the embodiment allows the data storage apparatus 100 to effectively predict the data pre-accessing target of the memory unit 120, so as to facilitate the data access efficiency of the memory unit 120.

Moreover, in an embodiment, the access location data may include a plurality of logical block addresses (LBAs) and a plurality of sector lengths. However, the invention is not limited thereto. Besides, since the prediction unit 110 of the data storage apparatus 100 of the embodiment performs the quantification process to acquire the quantized data for predicting the data pre-accessing target of the memory unit 120, the data storage apparatus 100 of the embodiment is also capable of reducing the data computational load.

Figure 3:
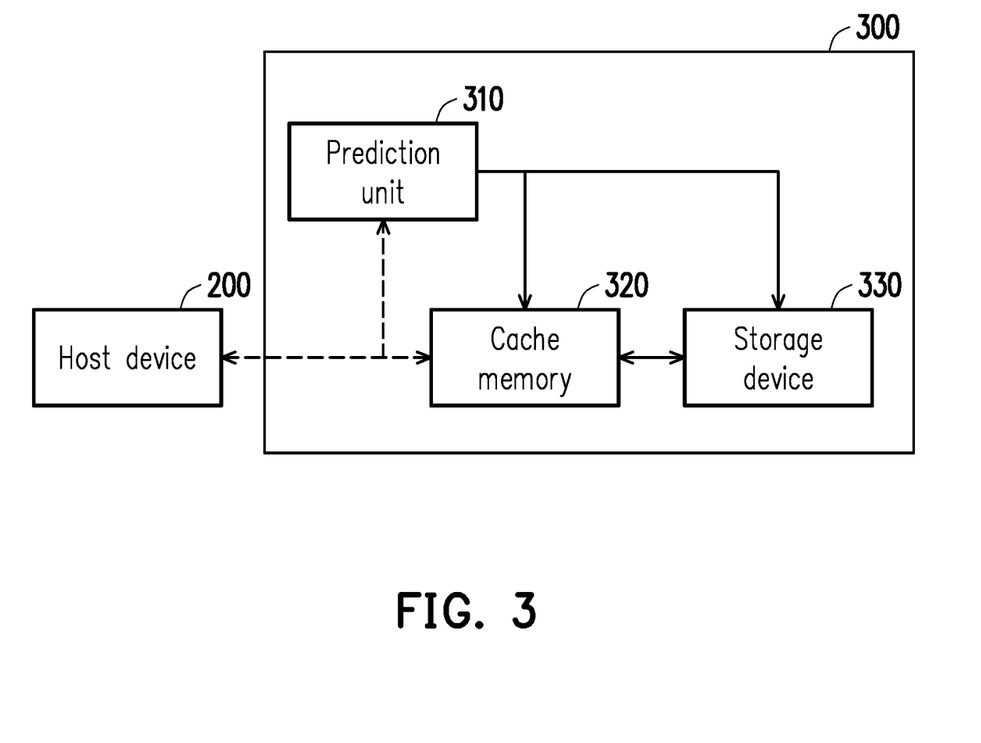
FIG. 3 is a functional diagram illustrating a data storage apparatus according to another embodiment of the invention.

FIG. 3 is a functional diagram illustrating a data storage apparatus according to another embodiment of the invention. Referring to FIG. 3, a data storage apparatus 300 is an implementation example of a data storage apparatus of the invention. In the embodiment, the data storage apparatus 300 includes a prediction unit 310, a cache memory 320, and a storage device 330. The cache memory 320 is coupled to the prediction unit 310 and the storage device 330, and is further coupled to an external host device 200. In the embodiment, the data storage apparatus 300 is a relevant apparatus having the demand for high speed data accessing, such as an apparatus applied in the field of cloud computing, the Internet of Things (IoT), big data computation, or artificial intelligence (AI). However, the invention is not limited thereto. Moreover, the data storage apparatus 300 may also be configured under the framework of a personal computer (PC) or a disk apparatus, etc. In the embodiment, the external host device 200 accesses the storage device 330 through the cache memory 320. The storage device 330 may be a temporary memory or a permanent memory. In the embodiment, the type of the storage device 300 may be determined according to different data storage applications. The invention does not intend to impose a limitation on this regard.

In the embodiment, the access memory 320 is configured to perform a plurality of data access actions on the storage device 330 according to a plurality of access commands provided by the external host apparatus 200. The access commands may be read commands or write commands. In the embodiment, the data storage apparatus 300 may further include a memory controller. In addition, the memory controller may further output an address command and a control command to the cache memory 320, for example, so as to operate the cache memory 320 to read data to or write data from the storage device 330.

In the embodiment, in order to facilitate the data access speed, the prediction unit 310 of the embodiment may collect a plurality of data access commands previously received from the external host apparatus 200, so as to predict the target data which the host apparatus 200 subsequently is more or less likely to acquire from the storage device 330. In other words, the memory controller may move the target data from the storage device 330 to the cache memory 320 in advance and move out other unnecessary data, so as to facilitate the access speed of the cache memory 320 and significantly save the data transfer time.

More specifically, the prediction unit 310 of the embodiment may collect a plurality of access information in the access commands previously provided by the external host apparatus 200. The access information includes the LBAs and the sector lengths corresponding to the storage device 330. The prediction unit 310 may perform a quantification process on the LBAs and the sector lengths, and then predict the data pre-accessing target of the cache memory 320 according to a plurality of quantized data, move target data from the storage device 330 to the cache memory 320 in advance according to the data pre-accessing target, and move unnecessary data from the cache memory 320 to the storage device 330. In other words, the prediction unit 310 of the embodiment may effectively determine hot data or cold data recorded in the storage device 330. The hot data or the cold data may be determined in correspondence with a data heat level in previous accessing. In other words, the data pre-accessing target of the embodiment may refer to, for example, a need for moving in hot data and a corresponding need for moving out cold data. Therefore, the data storage apparatus 300 of the embodiment is capable of offering highly efficient data access performance at a lower computational load.

Figure 4:
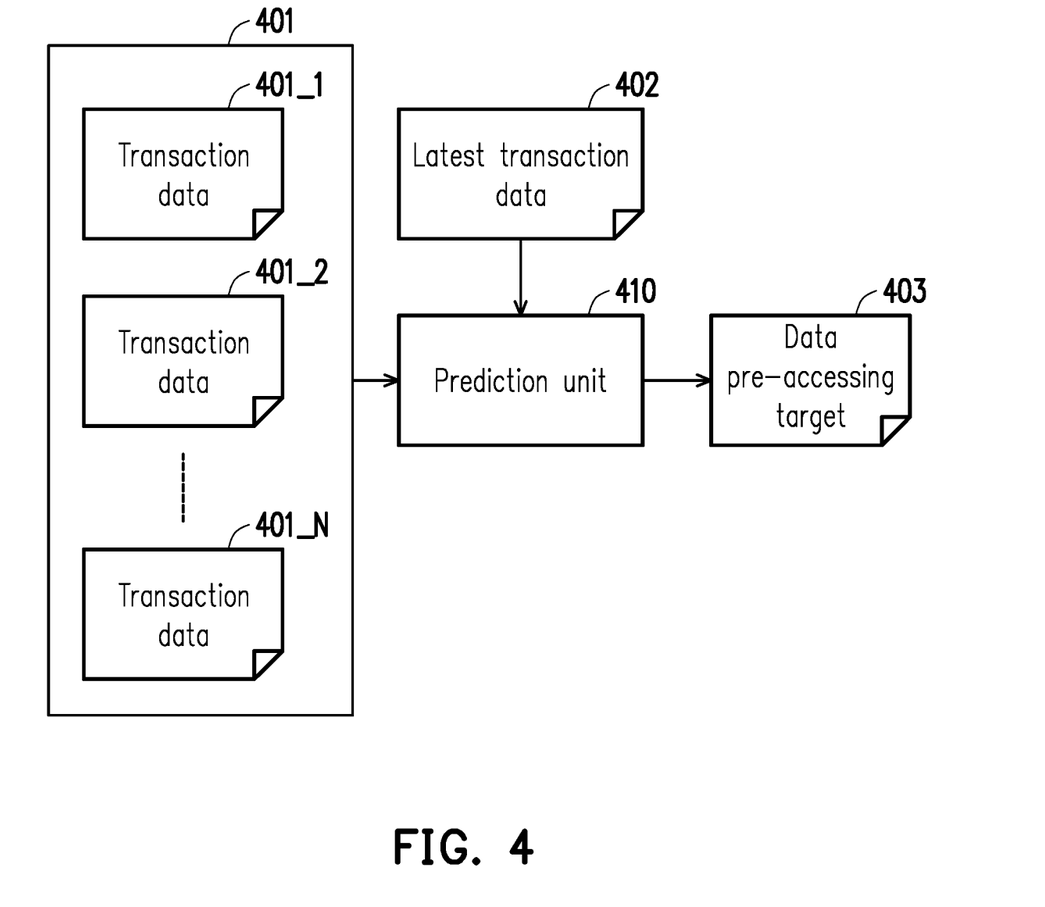
FIG. 4 is a schematic diagram illustrating a prediction unit according to an embodiment of the invention.
Figure 5:
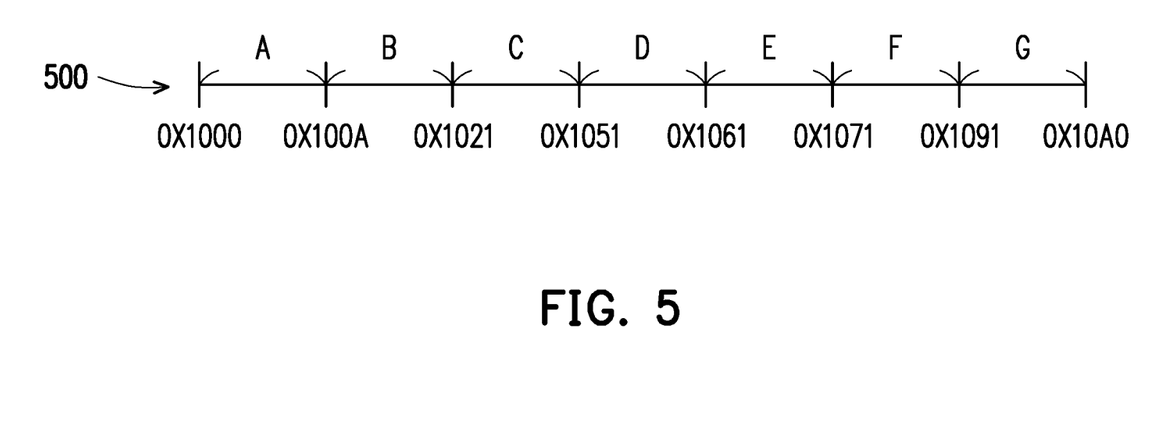
FIG. 5 is a schematic diagram illustrating a quantification process according to the embodiment of FIG. 4 of the invention.
Figure 6:
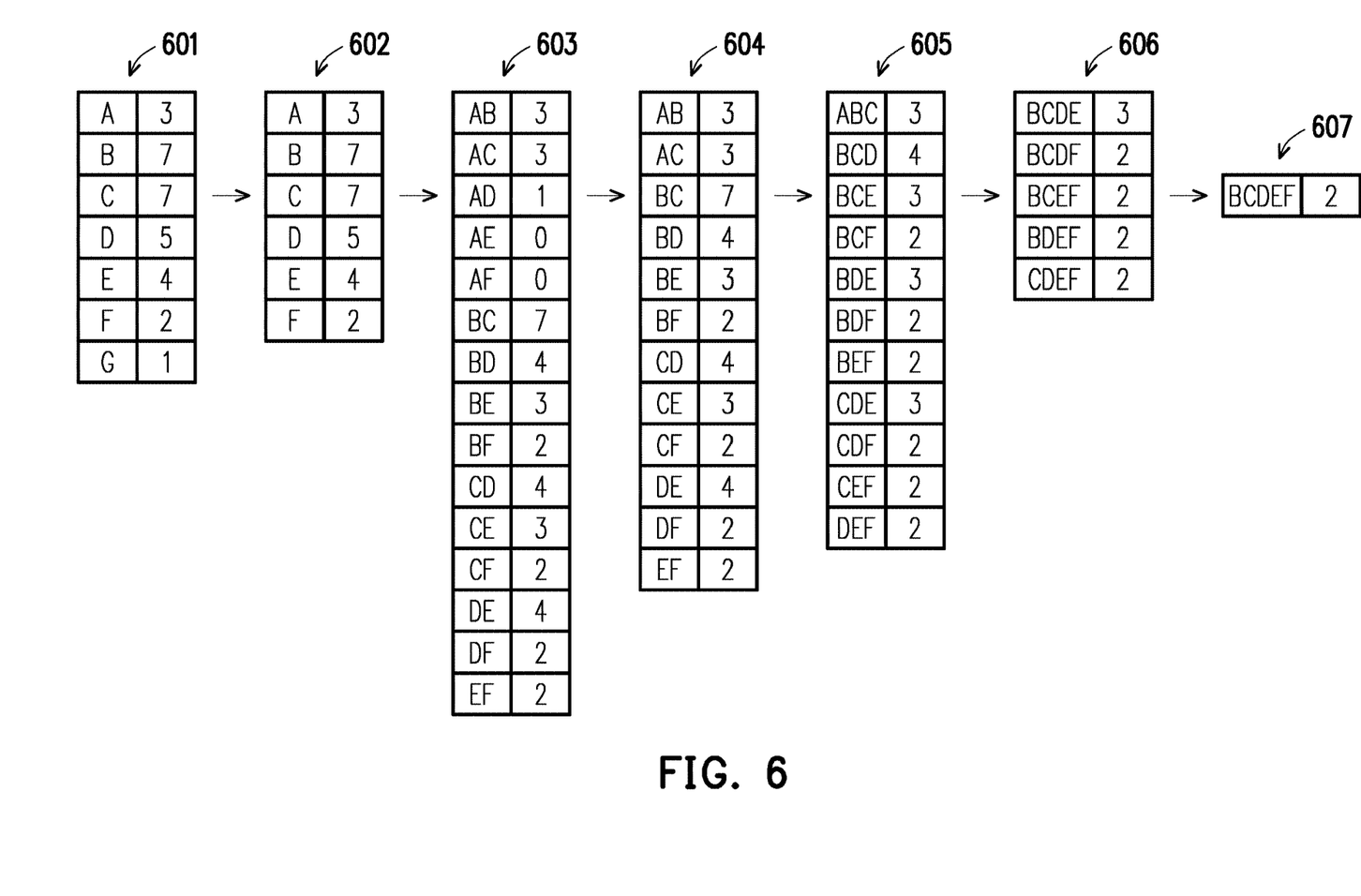
FIG. 6 is a schematic diagram illustrating an association rule analysis according to the embodiment of FIG. 4 of the invention.

FIG. 4 is a schematic diagram illustrating a prediction unit according to an embodiment of the invention. FIG. 5 is a schematic diagram illustrating a quantification process according to the embodiment of FIG. 4 of the invention. FIG. 6 is a schematic diagram illustrating an association rule analysis according to the embodiment of FIG. 4 of the invention. Referring to FIGS. 4 to 6, a prediction unit 410 may analyze the prior access history of a memory unit (e.g., the memory unit 120 of FIG. 1 or the cache memory 320 of FIG. 3) according to an association rule, so as to predict the data pre-accessing target of the memory unit. In the embodiment, the prediction unit 410 may perform the quantification process on the LBAs and the sector lengths, so as to generate a plurality of transaction data 401_1, 401_2, . . . , 401_N of the prior access history, and the prediction unit 410 may build up a transaction database 401 according to the transaction data 401_1, 401_2, . . . , 401_N, wherein N is a positive integer greater than 1.

For example, as shown in FIG. 5, a storage space 500 of the storage device is presented in a linear manner. In addition, the storage space 500 of the storage device is divided into a plurality of regions, for example, and the regions correspond to a plurality of access location items A to G. In the example, the access location item A may correspond to a range between addresses 0x1000 to 0x1009 in the storage space 500. The access location item B may correspond to a range between addresses 0x100A to 0x1020 in the storage space 500. The access location item C may correspond to a range between addresses 0x1021 to 0x1050 in the storage space 500. The access location item D may correspond to a range between addresses 0x1051 to 0x1060 in the storage space 500. The access location item E may correspond to a range between addresses 0x1061 to 0x1070 in the storage space 500. The access location item F may correspond to a range between addresses 0x1071 to 0x1090 in the storage space 500. The access location item G may correspond to a range between addresses 0x1091 to 0x10A0 in the storage space 500. However, the ranges of the addresses of the storage space 500 to which the access location items A to G correspond in the invention are not limited to those shown in FIG. 5. The ranges of the addresses of the storage space 500 to which the access location items A to G correspond in the invention may be the same or different, and may be determined according to different data storage requirements.

In the embodiment, the transaction data 401_1, 401_2, . . . , 401_N of the prior access history may include eight transaction data in Table 1 in the following, for example.

| Transaction Data | Starting logical block address (LBA) | Sector length | Access location item |
|---|---|---|---|
| 401_1 | 0x1005 | 0x50 | ABCD |
| 401_2 | 0x1013 | 0x50 | BCDE |
| 401_3 | 0x1005 | 0x20 | ABC |
| 401_4 | 0x1015 | 0x10 | BC |
| 401_5 | 0x1003 | 0x20 | ABC |
| 401_6 | 0x1055 | 0x10 | DE |
| 401_7 | 0x1010 | 0x70 | BCDEF |
| 401_8 | 0x1010 | 0x85 | BCDEFG |

In Table 1 above, the transaction data 401_1 to 401_8 respectively include at least one of the access location items A to G. In other words, the prediction unit 410 performs the quantification process on the LBAs and the sector lengths of the transaction data 401_1 to 401_8, so as to effectively reduce the data computational load in subsequent analyses. Then, a schematic view of the association rule analysis of FIG. 6 is shown. The prediction unit 410 may derive a plurality of classification data according to a minimum support level threshold and the access location items to which the transaction data 401_1 to 401_8 of Table 1 respectively correspond.

Specifically, the prediction unit 410 determines classification tables 601 to 607 as shown in FIG. 6 according to the access location items to which the transaction data 401_1 to 401_8 of Table 1 respectively correspond. The classification tables 601 to 607 respectively include the classification data, and each of the classification data includes at least one access location item and a corresponding support level. As shown in the classification table 601, the support level of the access location item A is 3. The support level of the access location item B is 7. The support level of the access location item C is 7. The support level of the access location item D is 5. The support level of the access location item E is 4. The support level of the access location item F is 2. The support level of the access location item G is 1. In addition, the minimum support level threshold may be set at 2 in default, for example. Therefore, the prediction unit 410 may derive another classification table 602 according to the classification table 601. In the classification table 602, the prediction unit 410 discards the access location item lower than the minimum support level threshold and the corresponding support level. Therefore, as shown in the classification table 602, the classification data of the access location items A to F are retained, and the classification data of the access location item G is discarded.

Then, the prediction unit 410 may derive another classification table 603 according to the classification table 602. As shown in the classification table 603, the support level of the access location item AB is 3. The support level of the access location item AC is 3. The support level of the access location item AD is 1. The support level of the access location item AE is 0. The support level of the access location item AF is 0. The support level of the access location item BC is 7. The support level of the access location item BD is 4. The support level of the access location item BE is 3. The support level of the access location item BF is 2. The support level of the access location item CD is 4. The support level of the access location item CE is 3. The support level of the access location item CF is 2. The support level of the access location item DE is 4. The support level of the access location item DF is 2. The support level of the access location item EF is 2. In addition, the minimum support level threshold may be set at 2 in default, for example. Therefore, the prediction unit 410 may derive another classification table 604 according to the classification table 603. In the classification table 604, the prediction unit 410 discards the classification data lower than the minimum support level threshold. Therefore, as shown in the classification table 604, the classification data of the access location items AB, AC, BC, BD, BE, BF, CD, CE, CF, DE, DF, and EF are retained, and the classification data of the rest access location items are discarded.

Then, the prediction unit 410 may derive another classification table 605 according to the classification table 604. As shown in the classification table 605, the support level of the access location item ABC is 3. The support level of the access location item BCD is 4. The support level of the access location item BCE is 3. The support level of the access location item BCF is 2. The support level of the access location item BDE is 3. The support level of the access location item BDF is 2. The support level of the access location item BEF is 2. The support level of the access location item CDE is 3. The support level of the access location item CDF is 2. The support level of the access location item CEF is 2. The support level of the access location item DEF is 2. In addition, the support levels of all the access location items are higher than the minimum support level threshold, so no classification data lower than the minimum support level threshold needs to be discarded from the classification table 605.

Then, the prediction unit 410 may derive another classification table 606 according to the classification table 605. As shown in the classification table 606, the support level of the access location item BCDE is 3. The support level of the access location item BCDF is 2. The support level of the access location item BCEF is 2. The support level of the access location item BDEF is 2. The support level of the access location item CDEF is 2. In addition, the support levels of all the access location items are higher than the minimum support level threshold, so no classification data lower than the minimum support level threshold needs to be discarded from the classification table 606. Then, the prediction unit 410 may derive another classification table 607 according to the classification table 606. As shown in the classification table 607, the support level of the access location item BCDEF is 2.

Regarding this, the prediction unit 410 of the embodiment may analyzes the classification data of the tables 601 to 607 acquired through derivation in FIG. 6 according to a minimum confidence level threshold, so as to determine a plurality of association rules, so that the prediction unit 410 may predict the data pre-accessing target of the memory unit according to the association rules. Moreover, in an embodiment, the minimum confidence level threshold may be 0.75, for example, and the prediction unit 410 may validate a plurality of association rules according to the classification data of the classification table 601 to 607 of FIG. 6. In the following, several examples of validation are described.

Here, the validation on the association between the access location item BCD and the access location item F is described as an example. The support level of the access location item BCDF is 2, and the support level of the access location item BCD is 4. Therefore, according to Equation (1) below, the confidence level of the access location item BCD and the access location item F is 0.5 and is smaller than 0.75 as the minimum confidence level threshold. Therefore, the prediction unit 410 does not establish an association rule between the access location item BCD and the access location item F.

$$\text{Confidence}=\text{Support}(BCDF)/\text{Support}(BCD)=2/4=0.5 \quad (1)$$

Here, the validation on the association between the access location item BD and the access location item E is described as an example. The support level of the access location item BDE is 3, and the support level of the access location item BD is 4. Therefore, according to Equation (2) below, the confidence level of the access location item BD and the access location item E is 0.75 and is equal to 0.75 as the minimum confidence level threshold. Therefore, the prediction unit 410 may establish an association rule between the access location item BD and the access location item E.

$$\text{Confidence}=\text{Support}(BDE)/\text{Support}(BD)=3/4=0.75 \quad (2)$$

Here, the validation on the association between the access location item A and the access location item BC is described as an example. The support level of the access location item ABC is 3, and the support level of the access location item A is 3. Therefore, according to Equation (3) below, the confidence level of the access location item A and the access location item BC is 1 and is higher than 0.75 as the minimum confidence level threshold. Therefore, the prediction unit 410 may establish an association rule between the access location item A and the access location item BC.

$$\text{Confidence}=\text{Support}(ABC)/\text{Support}(A)=3/3=1 \quad (3)$$

Based on the same principle, the prediction unit 410 may determine a plurality of association rules. When the prediction unit 410 receives a latest access location data, the prediction unit 410 may similarly perform the quantification process on the latest access location data to convert the latest access location data into a corresponding latest transaction data 402. Therefore, the prediction unit 410 may determine the corresponding access location item associated with the access location item of the transaction data 402 according to the association rules. Regarding this, the prediction unit 410 may reversely derive the corresponding access location item according to the quantification process, so as to effectively predict a data pre-accessing target 803 of the memory unit.

Figure 7:
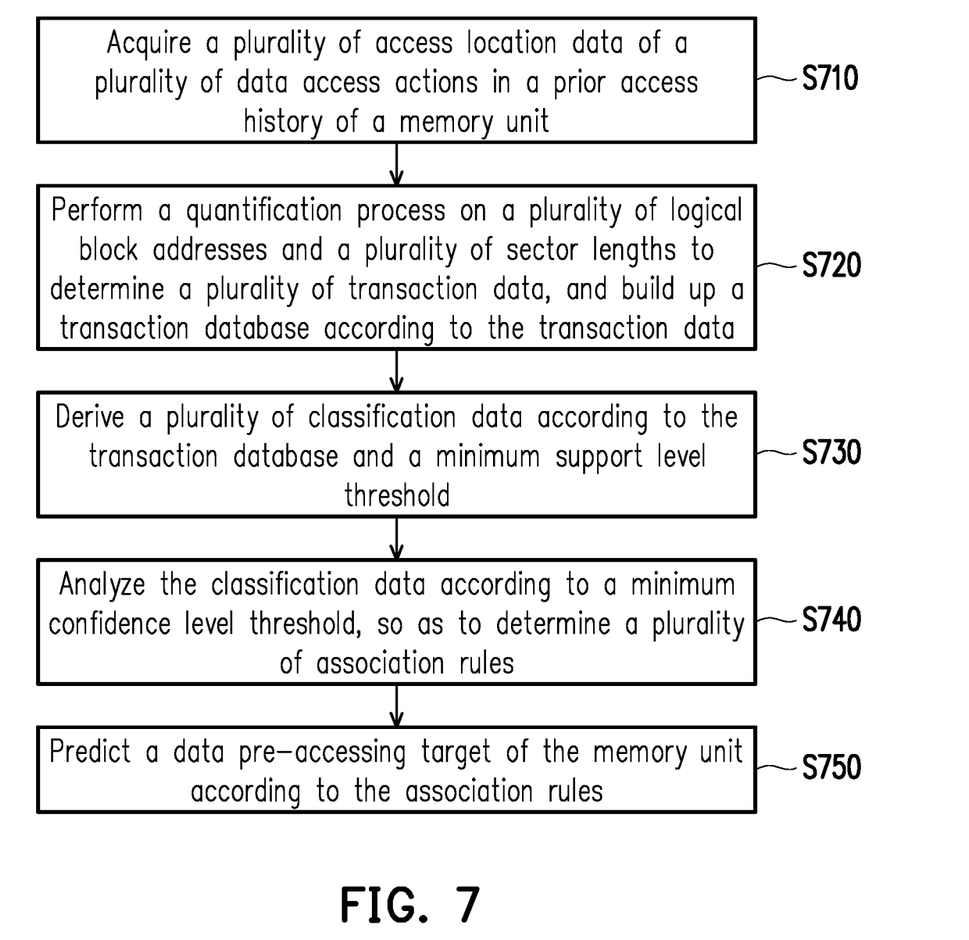
FIG. 7 is a flowchart illustrating a data prediction method according to another embodiment of the invention.

FIG. 7 is a flowchart illustrating a data prediction method according to another embodiment of the invention. Referring to FIGS. 1 and 7, the data prediction method of the embodiment is at least suitable for the data storage apparatus 100 in the embodiment of FIG. 1. In Step S710, the prediction unit 110 of the data storage apparatus 100 acquires the access location data of the data access actions in the prior access history of the memory unit 120. In Step S720, the prediction unit 110 performs the quantification process on the LBAs and the sector lengths of the access location data, so as to determine the transaction data. In addition, the prediction unit 110 builds up the transaction database according to the transaction data. In Step S730, the prediction unit 110 derives the classification data according to the transaction database and the minimum support level threshold. In Step S740, the prediction unit 110 analyzes the classification data according to the minimum confidence level threshold, so as to determine the association rules. In Step S750, when the prediction unit 110 receives the latest transaction data, the prediction unit 110 may predict the data pre-accessing target of the memory unit according to the association rules. Therefore, the data prediction method of the embodiment accurately predicts the data access needs of the memory unit 120 by using the association rule analysis, so as to effectively facilitate the data access efficiency of the memory unit 120.

Besides, the features, examples, and technical details of the relevant components of the data storage apparatus 100 of the embodiment may be referred to the descriptions about the embodiments shown in FIGS. 1 to 6 and therefore will not be repeated in the following.

Figure 8:
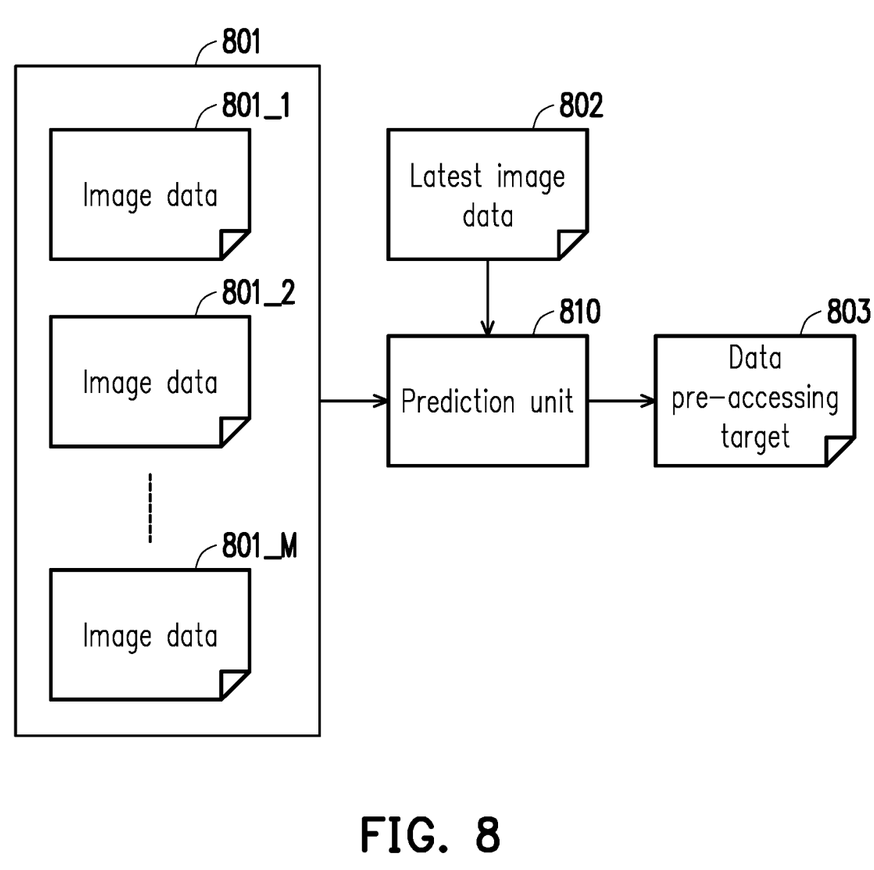
FIG. 8 is a schematic diagram illustrating a prediction unit according to another embodiment of the invention.
Figure 9:
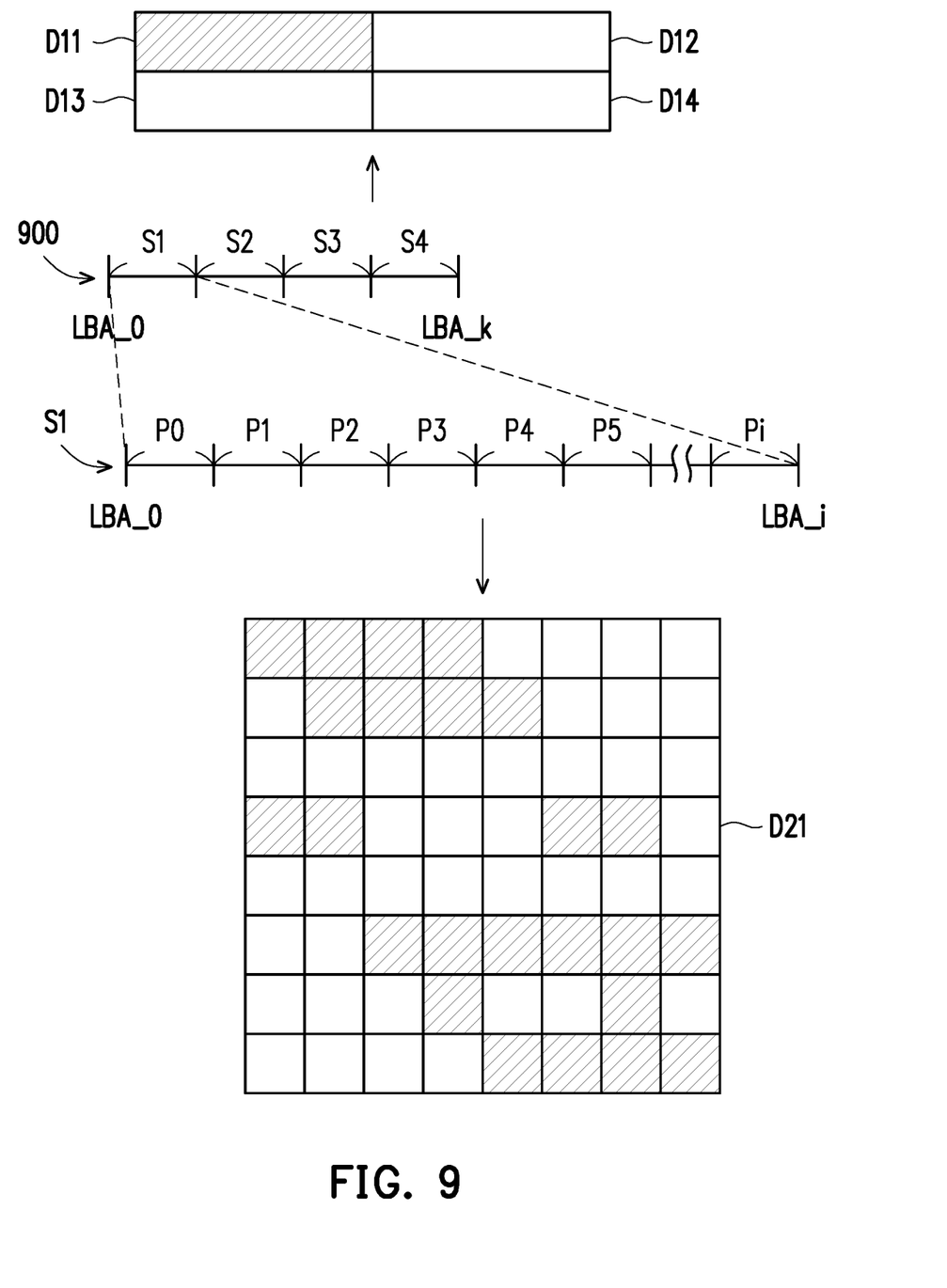
FIG. 9 is a schematic diagram illustrating a quantification process according to the embodiment of FIG. 8 of the invention.
Figure 10:
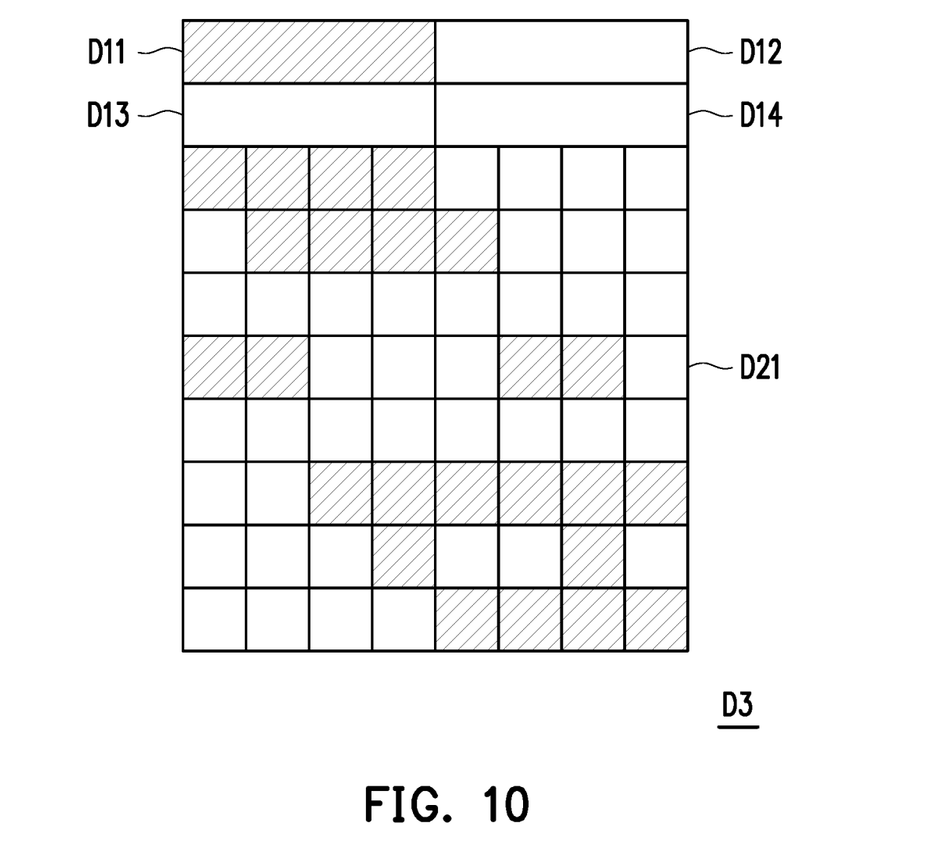
FIG. 10 is a schematic view illustrating image data according to the embodiment of FIG. 8 of the invention.

FIG. 8 is a schematic diagram illustrating a prediction unit according to another embodiment of the invention. FIG. 9 is a schematic diagram illustrating a quantification process according to the embodiment of FIG. 8 of the invention. FIG. 10 is a schematic view illustrating image data according to the embodiment of FIG. 8 of the invention. Referring to FIGS. 8 to 10, a prediction unit 810 may build up a neural network model according to the prior access history of the memory unit (e.g., the memory unit 120 of FIG. 1 or the cache memory 320 of FIG. 3), so as to identify the usage scenario of the prior access history, and the prediction unit 810 may predict the data pre-accessing target of the memory unit according to the neural network model. The following descriptions are based on an example using the convolutional neural network (CNN). However, the invention is not limited thereto. In an embodiment, the prediction unit 810 may also adopt a neural network model of other types. In the embodiment, the prediction unit 810 may perform the quantification process on the LBAs and the sector lengths, so as to generate a plurality of image data $801\_1, 801\_2, \ldots, 801\_M$ of the prior access history, and the prediction unit 810 may build up a transaction database 801 according to the image data 801_1, 801_2, ..., 801_M, wherein M is a positive integer greater than 1.

For example, in FIG. 9, a storage space 900 of the storage device is presented in a linear manner, and is described with one or more access location data of one or more data access actions of an access event in the prior access history. The prediction unit 810 may divide up the storage space 900 of the storage device, so as to determine regions S1 to S4. The storage space 900 refers to a space from a starting logical block address LBA_0 to a final logical block address LBA_k, wherein k is a positive integer greater than 1. Assuming that a data access action in the prior access history only accesses data in the region S1, the prediction unit 810 may perform the quantification process on data access distribution data of the region S1. In the embodiment, the region S1 refers to a space from the starting logical block address LBA_0 to a logical block address LBA_i, wherein i is a positive integer greater than 1. In the embodiment, the prediction unit 810 generates a plurality of corresponding first images D11 to D14 according to the regions S1 to S4 (e.g., a region once accessed corresponds to a pixel value 0, and a region not accessed corresponds to a pixel value 1). Besides, the prediction unit 810 associates each or each plurality of LBAs to a pixel data (P0 to Pi), so as to establish a second image D21 (e.g., an address once accessed corresponds to a pixel value 0, and an address not accessed corresponds to a pixel value 1). In other words, the prediction unit 810 determines the pixel data P0 to Pi of the second image D21 according to the LBAs and the sector lengths of the access event.

Therefore, the prediction unit 810 may combine the first images D11 to D14 and the second image D21, so as to generate image data D3 (e.g., one of the image data 801_1 to 801_M) as shown in FIG. 10. Based on the same principle, the prediction unit 810 may generate the corresponding image data 801_1 to 801_M according to the one or more data access actions of the data access events in the prior access history and train the convolutional neural network model by using the image data 801_1 to 801_M. When the prediction unit 810 receives the latest access location data, the prediction unit 810 may similarly perform the quantification process on the latest access location data to convert the latest access location data into a corresponding latest image data 802 and input the latest image data 802 to the convolutional neural network model. Therefore, the prediction unit 810 may identify the usage scenario of the image data 802 according to the convolutional neural network model and output a corresponding image identification result. The image identification result may be similar to the image identification result as shown in FIG. 10. Regarding this, the prediction unit 810 may reversely derive the image identification result according to the quantification process, so as to effectively predict the data pre-accessing target 803 of the memory unit.

However, the form of the image data of the invention is not limited to those illustrated in FIGS. 9 and 10. The embodiment merely serves to explain how the convolutional neural network is trained as well as the technical means and effects of predicting the data pre-accessing target 803 through image identification.

Figure 11:
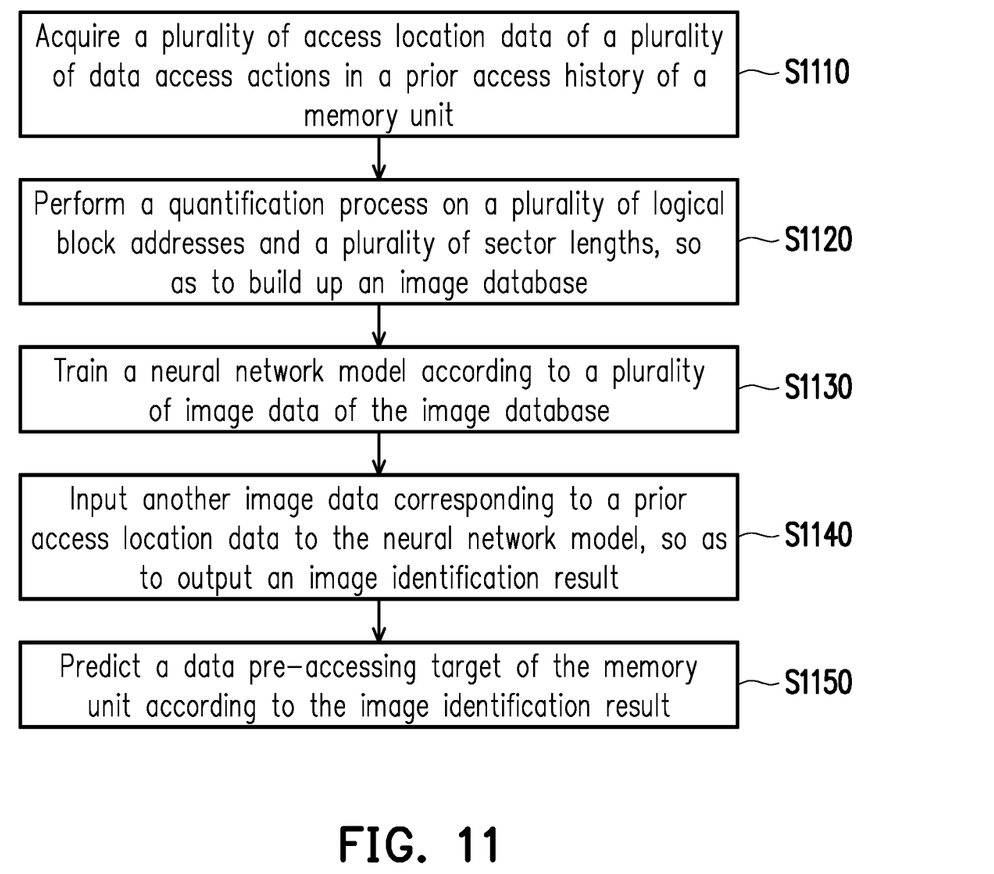
FIG. 11 is a flowchart illustrating a data prediction method according to yet another embodiment of the invention.

FIG. 11 is a flowchart illustrating a data prediction method according to yet another embodiment of the invention. Referring to FIGS. 1 and 11, the data prediction method of the embodiment is at least suitable for the data storage apparatus 100 in the embodiment of FIG. 1. In Step S1110, the prediction unit 110 of the data storage apparatus 100 acquires the access location data of the data access actions in the prior access history of the memory unit 120. In Step S1120, the prediction unit 110 performs the quantification process on the LBAs and the sector lengths of the access location data, so as to build up the image database. In Step S1130, the prediction unit 110 trains the neural network model according to the image data of the image database. In Step S1140, the prediction unit 110 inputs another image data corresponding to a prior access location data to the neural network model, so as to output the image identification result. In Step S1150, the prediction unit 110 predicts the data pre-accessing target of the memory unit 120 according to the image identification result. Therefore, the operation method of the embodiment accurately predicts the data access needs of the memory unit 120 by training the neural network model, so as to effectively facilitate the data access efficiency of the memory unit 120.

Besides, sufficient teaching, suggestions and descriptions of embodiments may be acquired through referring to relevant internal circuit components, technical details, and embodiments of the data storage apparatus 100 of the embodiment. Therefore, details in this regard will not be repeated in the following.

In view of the foregoing, in the data storage apparatus and the data prediction method thereof according to the embodiments of the invention, by performing the quantification process on the logical block addresses and the sector lengths in the access commands of the prior access history and adopting the association rule analysis or neural network computation, the data access needs of the cache memory can be effectively predicted, and the data computational load can be effectively reduced. In other words, in the data storage apparatus and the data prediction method thereof according to the embodiments of the invention, the predicted target data may be moved from the storage device to the memory unit in advance and other data that are unnecessary may be moved from the memory unit to the storage device in advance, so as to facilitate the data access efficiency of the memory unit and effectively reduce the waiting time required for the memory unit to access the storage device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A data storage apparatus, comprising:
a memory unit;
a storage device, coupled to the memory unit; and
a prediction unit, coupled to the memory unit and the storage device, and configured to acquire a plurality of access location data of a plurality of data access actions in a prior access history of the memory unit and analyze the prior access history of the memory unit, so as to determine hot data or cold data recorded in the storage device in correspondence with a data heat level in previous accessing, wherein the access location data comprises a plurality of logical block addresses and a plurality of sector lengths of the storage device,
wherein the prediction unit performs a quantification process on the logical block addresses and the sector lengths to acquire a plurality of transaction data corresponding to the prior access history, and the prediction unit builds up a transaction database according to the transaction data, wherein the prediction unit derives a plurality of classification data according to the transaction database and a minimum support level threshold, and the prediction unit analyzes the classification data according to a minimum confidence level threshold, so as to determine a plurality of association rules, and the prediction unit predicts a data pre-accessing target of the memory unit according to the transaction data.

2. The data storage apparatus as claimed in claim 1, wherein the memory unit is externally coupled to a host device, and the memory unit performs the data access actions according to a plurality of access commands of the external host, wherein the access commands comprise the access location data.

3. The data storage apparatus as claimed in claim 2, wherein the memory unit is a cache memory, and the memory unit moves a pre-accessing data from or into the cache memory through the storage device according to the data pre-accessing target.

4. The data storage apparatus as claimed in claim 1, wherein the prediction unit analyzes the prior access history of the memory unit according to the association rules, so as to predict the data pre-accessing target of the memory unit.

5. The data storage apparatus as claimed in claim 1, wherein the transaction database comprises a plurality of transaction data, and each of the transaction data comprises at least one of a plurality of access location items.

6. The data storage apparatus as claimed in claim 1, wherein the prediction unit builds up a neural network model according to the prior access history of the memory unit, the neural network model is configured to identify a usage scenario in the prior access history, and the prediction unit predicts the data pre-accessing target of the memory unit according to the neural network model.

7. The data storage apparatus as claimed in claim 6, wherein the prediction unit performs the quantification process on the logical block addresses and the sector lengths, so as to build up an image database, and the prediction unit trains the neural network model according to a plurality of image data of the image database,
wherein the prediction unit inputs another image data corresponding to a prior access location data to the neural network model to output an image identification result, and the prediction unit predicts the data pre-accessing target of the memory unit according to the image identification result.

8. The data storage apparatus as claimed in claim 7, wherein each of the image data comprises a plurality of first images and a plurality of second images, a plurality of first pixel data of the first images are determined according to quantification results of the logical block addresses and the sector lengths, and a plurality of second pixel data of the second images are determined according to quantification results of the first pixel data.

9. A data prediction method, adapted for a data storage apparatus, the data prediction method comprising:
acquiring, by a prediction unit, a plurality of access location data of a plurality of data access actions in a prior access history of a memory unit;
analyzing, by the prediction unit, the prior access history of the memory unit, so as to determine hot data or cold data recorded in a storage device in correspondence with a data heat level in previous accessing;
performing, by the prediction unit, a quantification process on the logical block addresses and the sector lengths, so as to acquire a plurality of transaction data corresponding to the prior access history, and building up, by the prediction unit, a transaction database according to the transaction data;
deriving, by the prediction unit, a plurality of classification data according to the transaction database and a minimum support level threshold, and analyzing, by the prediction unit, the classification data according to a minimum confidence level threshold, so as to determine a plurality of association rules; and
predicting, by the prediction unit, a data pre-accessing target of the memory unit according to the association rules,
wherein the access location data comprises a plurality of logical block addresses and a plurality of sector lengths of the storage device.

10. The data prediction method as claimed in claim 9, further comprising:
performing, by the memory unit, the data access actions according to a plurality of access commands of an external host, wherein the access commands comprise the access location data.

11. The data prediction method as claimed in claim 10, wherein the memory unit is a cache memory, and the data prediction method further comprises:
moving, by the memory unit, a pre-accessing data from or into the cache memory through the storage device according to the data pre-accessing target.

12. The data prediction method as claimed in claim 9, wherein predicting, by the prediction unit, the data pre-accessing target of the memory unit according to the quantized data comprises:
analyzing, by the prediction unit, the prior access history of the memory unit according to the association rules, so as to predict the data pre-accessing target of the memory unit.

13. The data prediction method as claimed in claim 9, wherein the transaction database comprises a plurality of transaction data, and each of the transaction data comprises at least one of a plurality of access location items.

14. The data prediction method as claimed in claim 9, wherein predicting, by the prediction unit, the data pre-accessing target of the memory unit according to the quantized data comprises:
building up, by the prediction unit, a neural network model according to the prior access history of the memory unit, wherein the neural network model is configured to identify a usage scenario in the prior access history; and
predicting, by the prediction unit, the data pre-accessing target of the memory unit according to the neural network model.

15. The data prediction method as claimed in claim 14, wherein performing, by the prediction unit, the quantification process on the access location data to acquire the quantized data corresponding to the prior access history comprises:
performing, by the prediction unit, the quantification process on the logical block addresses and the sector lengths, so as to build up an image database, and training, by the prediction unit, the neural network model according to a plurality of image data of the image database,
wherein predicting, by the prediction unit, the data pre-accessing target of the memory unit according to the neural network model comprises:
inputting, by the prediction unit, another image data corresponding to a prior access location data to the neural network model to output an image identification result, and predicting, by the prediction unit, the data pre-accessing target of the memory unit according to the image identification result.

16. The data prediction method as claimed in claim 15, wherein each of the image data comprises a plurality of first images and a plurality of second images, a plurality of first pixel data of the first images are determined according to quantification results of the logical block addresses and the sector lengths, and a plurality of second pixel data of the second images are determined according to quantification results of the first pixel data.

* * * * *